United States Patent
Bühring et al.

(10) Patent No.: US 8,043,683 B2
(45) Date of Patent: Oct. 25, 2011

(54) THERMOPLASTIC FILM

(75) Inventors: Jürgen Bühring, Göppingen (DE); Jürgen Marquardt, Freiburg (DE)

(73) Assignee: Benecke-Kaliko AG, Hanover (DE)

( * ) Notice: Subject to any disclaimer, the term of this patent is extended or adjusted under 35 U.S.C. 154(b) by 0 days.

(21) Appl. No.: 12/496,710

(22) Filed: Jul. 2, 2009

(65) Prior Publication Data
US 2009/0269538 A1 Oct. 29, 2009

Related U.S. Application Data

(63) Continuation of application No. PCT/EP2007/062044, filed on Nov. 8, 2007.

(30) Foreign Application Priority Data
Jan. 10, 2007 (DE) .......... 10 2007 002 230

(51) Int. Cl.
*B32B 27/08* (2006.01)
*B60R 21/215* (2006.01)

(52) U.S. Cl. ....... 428/43; 280/727; 280/728.3; 280/752; 428/131; 428/156

(58) Field of Classification Search .......... 428/43, 428/131, 156; 280/727, 728.3, 752
See application file for complete search history.

(56) References Cited

U.S. PATENT DOCUMENTS
7,534,318 B2  5/2009  Bühring et al.
2006/0220354 A1  10/2006  Geltinger et al.

FOREIGN PATENT DOCUMENTS
DE  10229962 A1  1/2004
EP  1199226 A2  4/2002
EP  1538175 A1  6/2005
EP  1705076 A1  9/2006
WO  0073369 A1  12/2000

OTHER PUBLICATIONS

Translation of DE 102 29 962 A1, Brockmann, Jan. 22, 2004 (see Applicant's IDS filed Jul. 2, 2009).*
International Search Report dated Sep. 1, 2008.

* cited by examiner

*Primary Examiner* — Brent O'Hern
(74) *Attorney, Agent, or Firm* — Laurence A. Greenberg; Werner H. Stemer; Ralph E. Locher

(57) ABSTRACT

A thermoplastic film for the interior paneling of motor vehicles has a top layer with a structured surface layer and a foamed layer on the underside and with indentations or material weak points introduced on the reverse side. The top layer has a residual thickness of at least 35% in the region of the indentations and the foamed layer has a thickness between 15 and 50% of the density of the compact top layer.

13 Claims, 1 Drawing Sheet

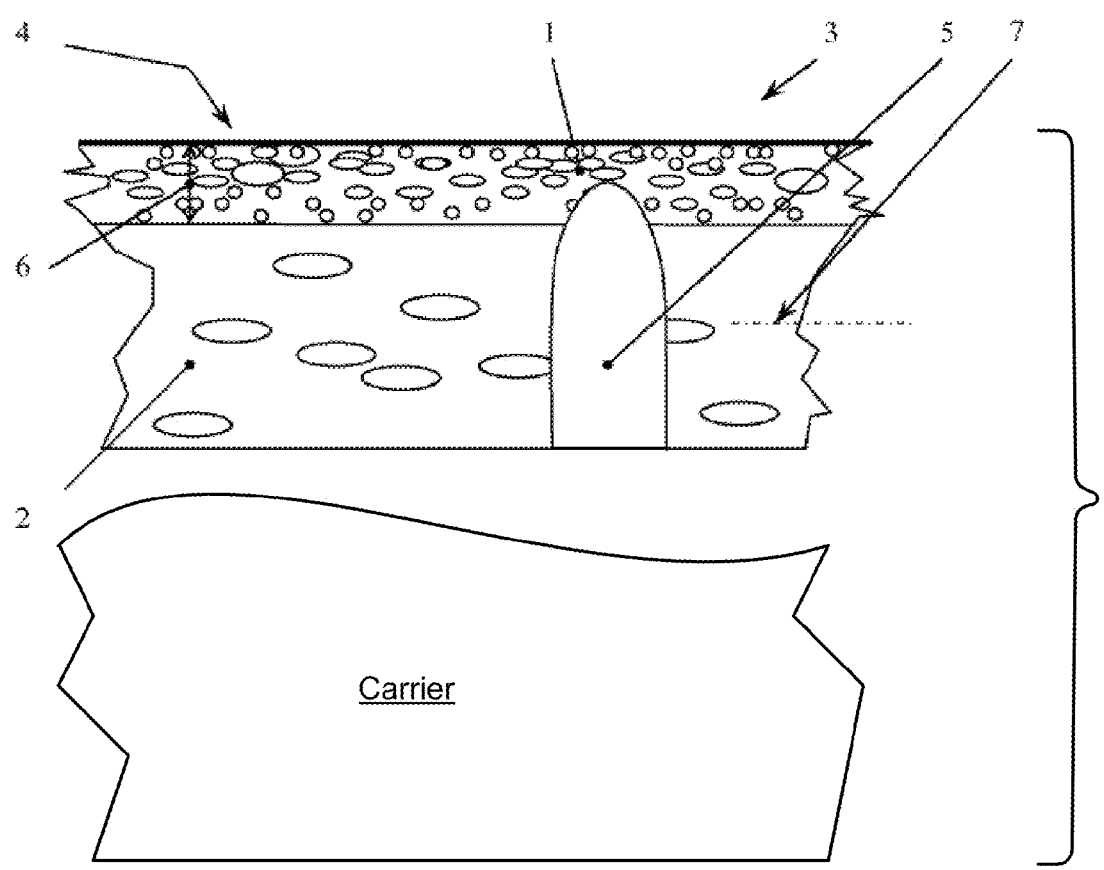

THERMOPLASTIC FILM

CROSS-REFERENCE TO RELATED APPLICATION

This is a continuation, under 35 U.S.C. §120, of copending international application No. PCT/EP2007/062044, filed Nov. 8, 2007, which designated the United States; this application also claims the priority, under 35 U.S.C. §119, of German patent application No. DE 10 2007 002 230.3, filed Jan. 10, 2007; the prior applications are herewith incorporated by reference in their entirety.

BACKGROUND OF THE INVENTION

Field of the Invention

The invention relates to a thermoplastic film or foil, especially for the interior paneling of motor vehicles. The film consists of an outer compact top layer with a three-dimensionally structured surface and a foamed layer on the underside, the film being applied in a shaping processing step to a carrier corresponding to the component shape and thus receiving its component shape. The film is provided on its reverse underside facing toward the carrier with indentations or material weak points introduced on the reverse side, i.e. with thickness reductions.

Thermoplastic moldings, molding films or molding skins for the interior paneling of motor vehicles are widely known and are used, for example, for interior paneling and linings in vehicles, i.e. as a cover for dashboards, door inserts, sun visors, etc. Such moldings consist typically of a multilayer underfoamed polymer film which, on its upper side, has a three-dimensionally structured, embossed surface, specifically a pattern effect or grain effect, in a wide variety of different shapes and configurations.

The moldings or molding films consist of a relatively hard upper layer of high density, specifically the top or decorative layer, which is provided with the embossed or impressed surface, and of a foam layer of lower density as the lower layer, which is laminated/adhesive-bonded to the underside and provides an attractive feel, i.e. a pleasant "softness" of the cover. The hard layer is also known as a "compact film."

Both the upper layer and the lower layer of the moldings/molded films may consist of several plies of different or differently formulated materials, i.e., for instance, of polymers such as PVC (polyvinyl chloride), PP (polypropylene), TPO (polyolefin), etc., or of a combination of such materials or similar materials.

The prior art discloses various methods for the production of such molded skins, for example rolling methods for producing "endless" film webs, or else methods for producing individual molded skins directly from the mold.

However, there is also a demand for roll methods in which a thermoplastic film is provided with a surface structure by an embossing process, i.e., for instance, with the aid of an embossing roll.

For the subsequent application of such a molding or of such a molded film to a dashboard support or to a prefabricated support part, produced for example from fiber-reinforced pulp, for a side door insert, the known methods include not only thermoforming but also a series of further forming methods, for instance pressure methods in which the film is pressed against molds or against the supports mentioned and receives their component shape.

For this purpose, commonly assigned U.S. Pat. No. 7,534, 318 B2 and its counterpart European published patent application EP 1538175 A1 disclose a decorative film, for example for dashboards, which is configured as a multilayer molding with an upper film. The upper film comprises at least partially crosslinked polymeric materials, for example based on polyolefins, and is provided with a foamed lower film with a particular gel content and fixed density. For the grain stability required in the performance of a subsequent thermoforming process, the decorative film is treated with electron beams which further crosslink the film or the molding and hence provide for the necessary stability.

Such a film, i.e. such a molding, thus consists, as already detailed above, of a composite of a plurality of layers, as a result of which the upper film is relatively highly crosslinked and the foamed lower film also has quite a stable configuration. The use of such a film as a cover of a support in combination with the airbag triggers present as standard in modern-day motor vehicles is possible only when the film which, of course, for example, covers the entire dashboard and hence also the trigger mechanism/the airbag, is weakened along a seam to tear open. This weakening is effected, for example, by a laser beam treatment, in which a laser beam burns or cuts part of the film thickness. A disadvantage is that the material weak point on the reverse side generated by the laser beam generally also becomes visible on the outside as a result of material relaxation in the course of time.

Since a strong trend toward improvement in the quality impression is being observed in the automobile interior sector, such irregularities are becoming less and less acceptable in the visible surface regions.

SUMMARY OF THE INVENTION

It is accordingly an object of the invention to provide a thermoplastic film, which overcomes the above-mentioned disadvantages of the heretofore-known devices and methods of this general type and which provides for a thermoplastic film that is producible with low material consumption without loss of quality, is suitable especially for shaping operations, for example thermoforming, and possesses a high-quality surface impression and can be used without extensive additional processing in the area of airbag triggers.

With the foregoing and other objects in view there is provided, in accordance with the invention, a thermoplastic film, in particular for the interior paneling for a motor vehicle. The thermoplastic film comprises:

an outer compact top layer formed with a three-dimensionally structured upper surface, the outer compact top layer having a given thickness and having a given density;

a foamed layer on an underside of the top layer, wherein the foamed layer and the outer compact top layer are configured to be applied in a shaping processing step to a carrier corresponding to a component shape and to assume the component shape;

the film being formed on a reverse underside facing toward the carrier with indentations or material weak points introduced from the reverse side;

the top layer, in a region of the indentations or material weak points having a residual thickness of at least 35% of the given thickness of the top layer in an unindented, unweakened portion thereof; and the foamed layer having a density, measured at half a layer thickness of the foamed layer, between 15% and 50% of the given density of the top layer.

The film, which may also be referred to as a laminate foil or plastic liner laminate, is particularly suited for the internal paneling of motor vehicles.

The compact top layer in the region of the indentations or material weak points has a residual thickness of at least 35% of the thickness of the unindented unweakened top layer. Preferably and depending on the grain structure and grain depth, however, a minimum thickness of 0.25 mm should be observed there, more preferably a thickness of 0.35 mm. At the same time, the foamed layer is configured such that it has a density at half the layer thickness, i.e. in the middle of the foamed layer, which is between 15 and 50% of the density of the compact top layer.

The indentation or the material weakening can be effected within the ranges mentioned by laser cutting/laser spotting, such that the film tears without any problems when the airbag generator is triggered and enables the airbag to inflate. It is found here that, surprisingly, the inventive configuration of the film, especially of the density of the foamed layer, prevents the foam layer from collapsing through the action of heat beyond the cutting width established in the course of laser cutting/laser spotting.

Such controlled configuration of the layers thus gives rise, overall, to an equally structure-stable and homogeneously yielding film with a good quality impression and without visible seam relaxation in the material, which, owing to its construction and material strength level, is particularly suitable for use in the area of airbag triggers.

In an advantageous development, the unindented unweakened top layer has a thickness of 0.4 to 0.8 mm and a residual thickness of 0.25 mm in the region of the indentations or material weaknesses, as already mentioned. This firstly gives rise to a particularly good adjustment of the film to a structural strength sufficient for shaping methods/thermoforming methods. In the case of appropriate grain configurations, a minimum thickness of 0.35 mm in the region of the material weak points is preferred.

In a further advantageous development, the foamed layer has a density measured at half the layer thickness of the foamed layer which is between 25 and 50% of the density of the compact top layer. The density of the foamed layer thus configured ensures a balanced and sufficient heat flow in the material, such that the caverns in the material which are generated by the laser remain narrow.

In a further advantageous development, the top layer consists of one or more materials from the group of polyolefin, polyurethane, polyvinyl chloride, partly crystalline polymer, amorphous polymer. These materials are particularly suitable for applications in the interior of motor vehicles and can be processed readily with the production methods customary here.

In a further advantageous development, the foamed layer consists of a polyolefin foam and has a polyethylene component whose melt flow index (MFI/2.16 kg, 190° C.) is less than 2 g/10 min, in which case the foamed layer may comprise a polypropylene component. Such a configuration facilitates the processing and the production of the films, which gives rise to a balanced ratio between flexibility of the material and required structural strength for thermoforming.

In a further advantageous development, the foamed layer has a compressive stress hardness of at most 250 kPa at an indentation depth of 25% of the total thickness of the unweakened foamed layer. This too serves to balance the use properties in production and in use in the vehicle. The same also applies to a further advantageous development, wherein the foamed layer has a compressive stress of at most 180 kPa, preferably at most 125 kPa.

The object stated at the outset is also achieved in an exceptional manner by an interior paneling part for a motor vehicle, preferably dashboard, provided with a thermoplastic film configured in accordance with the invention, said film being configured and being mounted on an appropriate support such that the indentations or material weak points of the film introduced on the reverse side form the tear seams of an airbag cover.

Other features which are considered as characteristic for the invention are set forth in the appended claims.

Although the invention is illustrated and described herein as embodied in a thermoplastic film, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE is a diagrammatic cross section illustrating the construction of a multilayer thermoplastic film according to the invention.

DETAILED DESCRIPTION OF THE INVENTION

Referring now to the sole FIGURE of the drawing in detail there is shown, in a highly diagrammatic cross section, a multilayer thermoplastic film 3, which is formed of a top layer 1 and a foamed layer 2. The film is configured for the paneling of a passenger vehicle dashboard in the area of an airbag generator. The thermoplastic film 3 is provided on its outer top layer with an embossed three-dimensionally structured surface 4, i.e., with a grain embossed on the outside by roll embossing.

The film 3 has indentations or material weak points 5 reaching through the foamed layer 2 into the top layer 1. The top layer in the region of the indentations or material weak points has a residual thickness of 60% here of the thickness 6 of the unindented, unweakened top layer 1. The foamed layer 2 has a density measured at half the layer thickness, i.e. in the middle 7 of the foamed layer, which is 35% of the density of the compact top layer 1.

The thickness 6 of the unindented unweakened top layer is 0.6 mm.

The invention claimed is:

1. A thermoplastic film without visible seam relaxation, comprising:
    an outer compact top layer formed with a three-dimensionally structured upper surface, said outer compact top layer having a given thickness and having a given density;
    a foamed layer on an underside of said top layer, wherein said foamed layer and said outer compact top layer are configured to be applied in a shaping processing step to a carrier corresponding to a component shape and to assume the component shape;
    the film being formed on a reverse underside, opposite from said top layer and facing toward the carrier with indentations or material weak points introduced from the reverse underside;
    said top layer, in a region of all of said indentations or material weak points having a residual thickness of at least 35% of the given thickness of said top layer in an unindented, unweakened portion thereof; and said foamed layer having a density, measured in said foamed layer half way between the reverse underside of said foamed layer and said underside of said top layer, between 15% and 50% of the given density of said top layer.

2. The thermoplastic film according to claim 1, wherein the given thickness of the unindented, unweakened said top layer is 0.4 to 0.8 mm and the residual thickness at said indentations or material weak points is at least 0.25 mm.

3. The thermoplastic film according to claim 2, wherein the residual thickness at said indentations or material weak points is at least 0.35 mm.

4. The thermoplastic film according to claim 1, wherein said foamed layer has a density, measured at half the layer thickness of said foamed layer, between 25% and 50% of the given density of said top layer.

5. The thermoplastic film according to claim 1, wherein said top layer consists of one or more materials selected from the group consisting of polyolefin, polyurethane, polyvinyl chloride, partly crystalline polymer, and amorphous polymer.

6. The thermoplastic film according to claim 1, wherein said foamed layer comprises a polyolefin foam and a polyethylene component having a melt flow index less than 2 g/10 min.

7. The thermoplastic film according to claim 6, wherein said foamed layer contains a polypropylene component.

8. The thermoplastic film according to claim 1, wherein said foamed layer has a compressive stress hardness of at most 250 kPa at an indentation depth of 25% of a total thickness of the unweakened said foamed layer.

9. The thermoplastic film according to claim 8, wherein said foamed layer has a compressive stress hardness of at most 180 kPa.

10. The thermoplastic film according to claim 8, wherein said foamed layer has a compressive stress hardness of at most 125 kPa.

11. The thermoplastic film according to claim 1, wherein the carrier corresponds to a component shape in a motor vehicle and the thermoplastic film is configured to form an interior paneling of the motor vehicle.

12. An interior paneling part for a motor vehicle, comprising a thermoplastic film according to claim 1, wherein the indentations or material weak points of the film introduced on the reverse side form tear seams of an airbag cover.

13. The paneling part according to claim 12, configured as a dashboard.

* * * * *